US006769620B2

(12) United States Patent
Devaux et al.

(10) Patent No.: US 6,769,620 B2
(45) Date of Patent: Aug. 3, 2004

(54) IC CARD READER WITH IMPROVED MAN-MACHINED INTERFACE

(75) Inventors: François Devaux, Paris (FR); Daniel Perrot, Maurepas (FR)

(73) Assignee: Oberthur Card Systems SA, Paris (FR)

( * ) Notice: Subject to any disclaimer, the term of this patent is extended or adjusted under 35 U.S.C. 154(b) by 70 days.

(21) Appl. No.: 09/147,608

(22) PCT Filed: Jul. 25, 1997

(86) PCT No.: PCT/FR97/01392

§ 371 (c)(1),
(2), (4) Date: Feb. 1, 1999

(87) PCT Pub. No.: WO98/05009

PCT Pub. Date: Feb. 5, 1998

(65) Prior Publication Data

US 2001/0045453 A1 Nov. 29, 2001

(30) Foreign Application Priority Data

Jul. 30, 1996 (FR) .......................... 96 09572

(51) Int. Cl.[7] ................................ G06K 5/00
(52) U.S. Cl. .................. 235/492; 235/380; 340/5.4; 340/5.6
(58) Field of Search ................ 235/492, 380, 235/375, 379; 340/5.4, 5.6; 705/1, 41, 43; 902/22, 25, 26

(56) References Cited

U.S. PATENT DOCUMENTS

| 5,148,481 A | * | 9/1992 | Abraham et al. ............. 380/46 |
| 5,352,875 A | | 10/1994 | Enomoto .................... 235/380 |
| 5,367,149 A | | 11/1994 | Takahira .................... 235/380 |
| 5,390,331 A | | 2/1995 | Yui ........................... 711/115 |
| 5,491,827 A | * | 2/1996 | Holtey ........................ 711/163 |
| 5,557,795 A | * | 9/1996 | Venable ....................... 703/23 |
| 5,630,168 A | * | 5/1997 | Rosebrugh et al. .... 235/462.49 |
| 5,644,728 A | * | 7/1997 | Pillans ........................ 705/43 |
| 5,682,027 A | * | 10/1997 | Bertina et al. .............. 235/380 |
| 5,705,798 A | * | 1/1998 | Tarbox ........................ 235/379 |
| 5,802,519 A | * | 9/1998 | De Jong ..................... 707/100 |
| 5,844,218 A | * | 12/1998 | Kawan et al. .............. 235/380 |
| 5,899,998 A | * | 5/1999 | McGauley et al. ....... 707/104.1 |
| 6,016,484 A | * | 1/2000 | Williams et al. .............. 705/39 |
| 6,038,640 A | * | 3/2000 | Terme ........................ 701/115 |
| 6,065,679 A | * | 5/2000 | Levie et al. ........... 235/462.47 |
| 6,149,055 A | * | 11/2000 | Gatto ......................... 235/379 |

FOREIGN PATENT DOCUMENTS

| EP | 0 614 302 | 9/1994 |
| EP | 0 717 381 | 6/1996 |
| EP | WO 0046666 A2 * | 8/2000 |
| FR | 2 696 888 | 4/1994 |

* cited by examiner

*Primary Examiner*—Michael G. Lee
*Assistant Examiner*—Ahshik Kim
(74) *Attorney, Agent, or Firm*—Oblon, Spivak, McClelland, Maier & Neustadt, P.C.

(57) ABSTRACT

This IC card reader (1) is intended to release the software workload of a smart IC card (2) which itself supervises the running of its transaction. It is managed by a circuit (14) with microcontroller (140) and memory (141) and includes display means (11). It contains in memory (141) a library of programs which define visual, audio or other objects that are displayed on the display means and are executed by its circuit (14) with microcontroller (140) and memory (141) in response to a call from the connected IC card (2). By virtue of this library of programs, the IC card reader (1) provides a connected IC card (2) with a particularly sophisticated man-machine interface accessible using simplified commands. The object program calls are advantageously accompanied by parameters allowing the way in which the objects are defined and animated to be adjusted at leisure.

6 Claims, 1 Drawing Sheet

IC CARD READER WITH IMPROVED MAN-MACHINED INTERFACE

Figure 1:
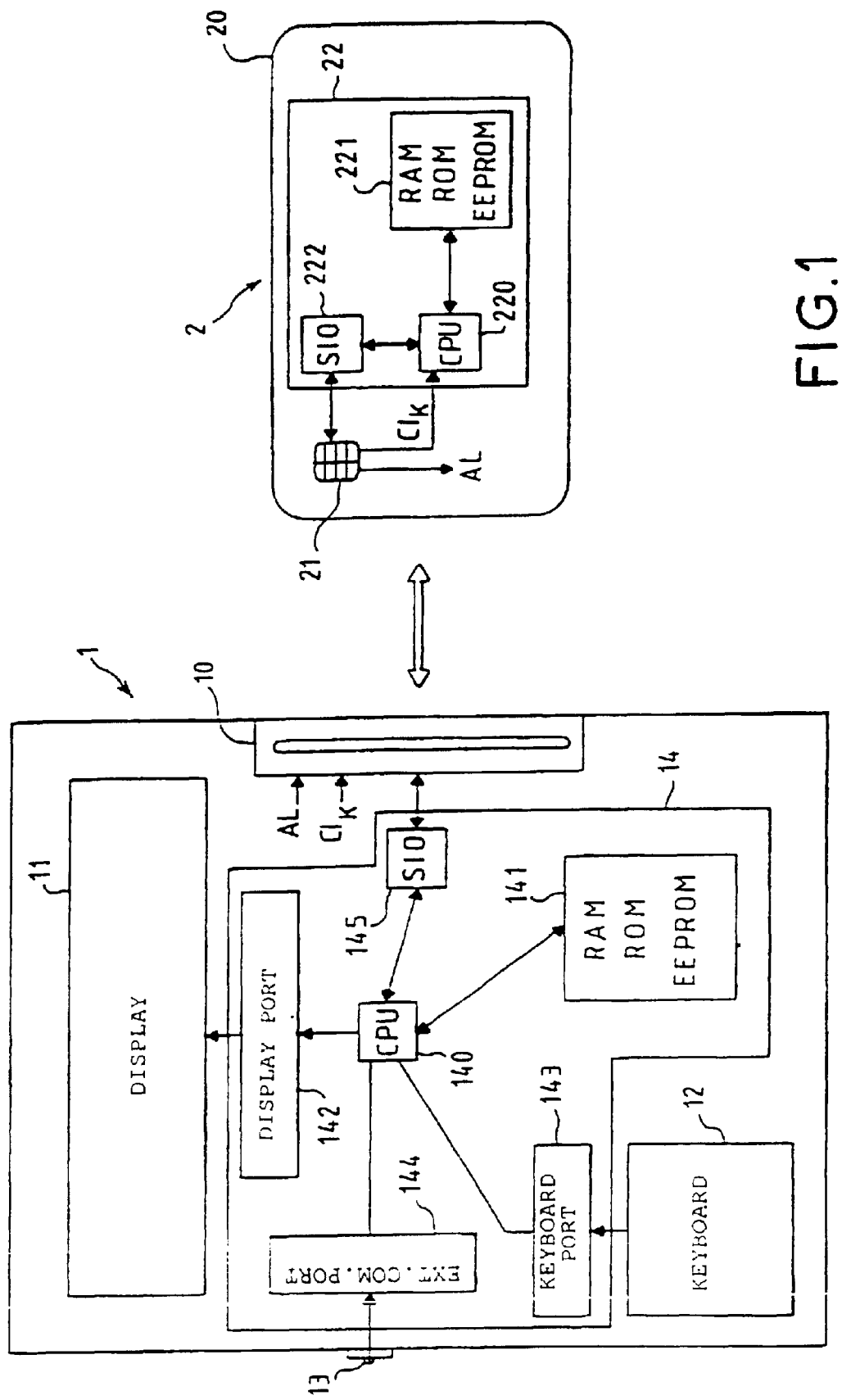

The term IC card is used to denote cards, generally the size of a credit card, but alternatively tokens, which are provided with an electronic microcircuit based on memories and a microcontroller which are designed to make it possible to run a transaction, for example a financial, medical or other transaction, referred to below as an application.

Known IC card readers are provided with a system which provides an information exchange link with an IC card, either by means of a multipin electrical connector, or by means of a capacitive or inductive antenna. They are essentially of two types: either self-contained or transparent.

Self-contained readers are ones which work on their own. They have communication elements which are sufficient to allow an individual to monitor and understand the running of an application: keyboard and displays which, like the information exchange link with the IC card, are managed by the reader's own microcontroller which has a program specific to the application in question.

Transparent IC card readers are used for the IC card to access a computer system programmed especially for the application in question. For the computer system, they behave as a simple input/output port especially designed for an IC card.

The majority of IC card readers use the IC card as a simple secure-data medium or for the security or encryption functions which it can offer. They transmit instructions to the IC card which are set in a form which accords with a specific information exchange protocol, often the one defined in standard ISO 7816-3, and manage the response from the IC card, which they process themselves if they are self-contained, or return to the computer system to which they are connected, if they are transparent.

The intelligence of the application therefore lies either in the reader or in the computer system associated with the reader. The drawback of this is the need for specialization of the reader, or of the [lacuna] if it is self-contained, or that of the associated computer system if the reader is a transparent one. This constitutes an obstacle to the development of IC card applications.

To overcome this drawback, it has been proposed to shift the intelligence of the application to the IC card itself, which either stores the application management program in a high-level programming language, or receives it from the reader, still in a high-level programming language, this being for the purpose of security, and executes it by resorting to its own microcontroller and only the information display and entry capacities of the reader, which becomes generalized.

However, problems are frequently encountered with the limited processing and storage capacities of an IC card, as well as with the low bit rate of the transmission link connecting the IC card to its reader for exchanging the information, the consequence of this is that real-time management of the display of the reader from the IC card during the running of an application ends up with a brief display which does not facilitate dialogue with the user of an application as much as might be desired.

It is in particular difficult to have the microcontroller of an IC card execute an application management program which includes sophisticated display and, above all, animation jobs, even though these jobs are secondary tasks which are encountered more and more often in the most widespread of applications and which the modern definition rules for man-machine interfaces are making more elaborate day by day.

The object of the present invention is to tackle the aforementioned drawback and relieve the software workload of an IC card during the running of an application, by moving software tasks which are not specific to a particular type of application into the reader in order to increase the capacity of an IC card to support applications of greater and greater sizes.

It relates to a reader for IC cards with improved man-machine interface, having means for connection with an IC card, means for managing, at the instigation of the reader, exchanges of information with a connected IC card, means for displaying and entering information, and a circuit with microcontroller and memory which operates using programmed logic and establishes and manages a transmission link with the connected IC card, manages the means for displaying and entering information, processes the information: data and/or instructions received from the connected IC card and works out information: data, instructions or reports intended for the connected IC card. This IC card reader is noteworthy in that its circuit with microcontroller and memory is provided with a multitask operating system, and contains space in memory for a library of programs which define visual and/or audio, or other objects that are displayed on the display means and are executed by the circuit with microcontroller and memory of the said reader under the supervision of its operating system, as basic background task, in response to a call coming from a transaction management program which may equally well run by the connected IC card or by the said reader.

Other characteristics and advantages of the invention will emerge from the following description of an embodiment of the invention, which is given by way of example. This description will be given with reference to the drawing, in which the single FIGURE schematically illustrates the architecture of an IC card reader according to the invention and of an IC card.

This FIGURE shows an IC card reader 1 in the presence of an IC card 2.

The IC card 2 has a plastic support card 20 provided with a set of electrical contacts 21 which are connected to an electronic microcircuit 22 embedded under the contacts. The microcircuit 22 principally contains a microcontroller (CPU) 220 connected with the memory 221 partly RAM and partly permanent, both of the ROM type and of the EEPROM type, intended to store some or all of the data and programs needed for an application, and with a serial input/output port (SIO) 222 which leads to one of the contacts and is intended for exchanging information with a reader. The set of electrical contacts 21 allows the electronic microcircuit 22 of the card to be provided, from a reader, with the electrical power supply A1 which it needs in order to function, and with the auxiliary signals such as a clock signal $Cl_k$. It also makes it possible to convey a reset acknowledgement signal coming from the electronic microcircuit of the card to a reader, and exchange information between the card and a reader.

The IC card reader 1 contains an IC card connector 10, a display screen 11, a keyboard 12, an external communication connector 13 and a programmed-logic electronic control and management circuit 14. The electronic control and management circuit 14 principally includes a microcontroller (CPU) 140 connected with the memory 141 which is partly RAM and partly permanent, both of the ROM type and of the EEPROM type, and a set of input/output ports, including a display port 142, a keyboard port 143, an external communication port 144 and a serial port (SIO) 145 connected to the IC card connector 10.

The IC card 2 and the IC card reader 1 have specific operating systems in (ROM) memory 221 and 141, respectively. The operating system specific to the IC card 2 is executed by the IC card microcontroller 220 as soon as it receives an electrical power supply from outside. It allows the microcontroller 220 of the IC card 2 to manage, on the one hand, the memory 221 of the IC card 2 securely and, on the other hand, the serial input/output port (SIO) 220 of the IC card 2, which is accessible from the electrical contacts 21, in accordance with a protocol defining the features of an exchange of information with the IC card reader 1, such as, for example, the one defined by standard ISO 7816-3. The operating system specific to the IC card reader 1 is executed by the microcontroller 140 of the IC card reader 1 as soon as it is powered up. It allows the microcontroller 140 of the IC card reader 1 to manage the memory 141 and the various input/output ports 142, 143, 144, 145 of the IC card reader 1, with the management of the serial input/output port 145 connected to the IC card connector 10 according with the information exchange protocol adopted by the IC card reader 2.

The application management program which defines the running of the application of the IC card constitutes a logic level external to the operating systems. It is stored or imported either in the memory 141 of the IC card reader 1, or in the memory 221 of the IC card 2. When it is stored or imported in the memory 141 of the IC card reader 1, this is with a view to its being executed by the microcontroller 140 of the IC card reader 1, under the supervision of the operating system of the IC card reader 1. The intelligence of the application then lies in the IC card reader 1, which has the drawback of it specialized on the basis of applications which have to be specified in advance. When the program of the application is stored or imported in the memory 221 of the IC card 2, this is with a view to its being executed by the microcontroller 220 of the IC card 2, under the supervision of the operating system of the IC card 2, which then uses the external communication facilities provided by the IC card reader 1 in order to carry through the dialogue with the user that the application requires of him. The intelligence of the application then lies in the IC card 1 itself, which has the advantage of allowing the IC card reader to be generalized in return for making the tasks of the electronic microcircuit of the IC card 2 more complex.

Because they are fitted in cards, the electronic microcircuits of IC cards undergo significant stresses which currently limit their size to 23 or 25 mm$^2$. For this reason, and in view of the state of the art in terms of microelectronics, it is difficult to fit microcontrollers with more than 8 kilobytes of EEPROM memory in cards, which greatly limits the complexity of the programs which can be stored in an IC card.

In order to make a program more compact and to bring its execution within the capability of an electronic microcircuit with the limited performance of an IC card, it is advantageous to use an interpreted programming language in the IC card. The results of interpreting the management program of an application in the IC card is, amongst other things, that there will be requests for performing tasks which are made in a communication language, some of which will be sent to the reader. The command interpreters of the operating systems of the IC card 2 and of the IC card reader 1 are therefore adapted so that they can recognize the commands of this interpreted communication language which they are liable to receive. Among the commands of the interpreted communication language, it is advantageous to provide instructions to execute complex functions which concern the external communication interfaces of the IC card reader 1, without being specific to an application, the execution of which may be entirely undertaken by the IC card reader 1. In these complex functions, there is one particularly advantageous category, namely that relating to the creation and animation of visual, audio or other objects. The functions in this category are defined by particular programs, known as object programs executed in the background in a multitask environment, in response to a possibly parametrized call coming from the main management program of the application. The IC card reader 1 is therefore provided with a multitask operating system and a library of object programs which are either resident or imported in its memory 141.

The concept of object programs which are hosted and executed by the IC card reader and are launched by the IC card makes it possible to profit from the capacity of the IC card to supervise the running of an application, and the capacity of the IC card reader to provide an acceptable man-machine interface, under the supervision of the IC card.

When an application is running, the IC card sends the IC card reader commands to create particular objects, for example the presentation of prompt menus or animations on the display. Once they have been created, these objects are genuine entities which are managed only by the microcontroller of the IC card reader, running the appropriate object programs in the background, but which the IC card can control at any time using specific commands, for example delete commands.

The decision for the IC card to carry out any processing, whether the creation of an object or other processing, is taken at the appropriate time in the running of an application by the IC card which specifies its characteristics and supervises its correct execution. All that the IC card reader does is to execute the processing corresponding to the possibly parametrized commands received from the IC card, and transmit execution reports to the IC card.

The objects which the IC card reader can create are advantageously visual objects presented on the display in order to facilitate the man-machine interface, for example an on-screen animation indicating that a task is currently being executed. This animation results from the background execution of a specific object program activated by the operating system command interpreter of the IC card receiver on receipt, from the IC card, of an appropriate command which are accompanied by parameters defining its properties, referred to as object attributes. This animation may, for example, consist in displaying a small character who crosses the screen of the display. In this case, the object attributes may relate to the size and the initial position of the character, the direction and the sense in which he moves, the speed at which he moves, his display priority in relation to other objects etc.

In order to be able to undertake the creation and animation of objects, the IC card reader 1 is provided in memory 141 with a library of object programs which may either be permanently installed and therefore resident, or imported from an IC card or a connected computer system. Importing an object program from the IC card 1 may be an advantage, when the form of the object is specific to an application, for example the logo of the proprietor of the application, and when handling this object exceeds the processing capacity of the microcontroller of the IC card 1. These object programs are called by the main application management program, or by one of them, with possible parameters, referred to as attributes, which affect the definition or the animation of the object.

An object may contain a plurality of objects having their own definitions and animations. It then constitutes an entity known as a scenario. A scenario program organizes the relationships between the objects which it contains, and which it causes to be created and animated by calling their respective object programs. The relationships between the various objects of a scenario may either be fixed or alterable on the basis of attributes which accompany the call for the program of the scenario and which may be attributes particular to the scenario or attributes particular to the requested objects. They may also be static or dynamic and change with time.

The attributes of an object describe its affiliation links with other objects and the objectives which it is to fulfill.

The affiliation links of a scenario determine the order of the objects to be sequenced in the scenario, and possibly the dynamic make-up of one or more of its objects, which makes it possible to adapt the animation of the scenario to a changing request. The affiliation links for an object other than a scenario declare all the objects with descending affiliation which may constitute the object. In this case, the parent object takes on the attributes of each object forming it.

The objectives of an object determine its behaviour. They are described in the form of instruction codes which will interpret the values provided by the processing environment.

The objects may be handled externally to the IC card reader, at the instigation of the IC card itself, or internally to the IC card reader. It is done on request by the management program of an application. In the scope of external handling, the call for an object program may be made with incomplete attributes since an IC card will not necessarily know all the characteristics of the reader and its display. The missing attributes are then completed, when they are essential, by the IC card reader while taking its own capabilities into account.

The object programs stored in the form of a library in the memory of the IC card reader are advantageously standardized so that they can be utilized without difficulty by a great variety of application management programs.

What is claimed is:

1. An IC card reader system, comprising:
    an IC card adapted to be carried by a user of the system and comprising:
        an operating system,
        a microcontroller,
        memory, and
        an application management program stored in the memory, and configured to supervise the running of an application; and
    an IC card reader configured to read the IC card and comprising:
        memory configured to store a library of object oriented programs,
        a processing unit configured to execute the object oriented programs in a multitask environment, and
        a multitask operating system configured to control the memory of the IC card reader and the processing unit regarding running the application in response to receiving a call from the application management program of the IC card;
    wherein the application management program is executed by the microcontroller of the IC card under the supervision of the operating system of the IC card and the IC card is configured to send the IC card reader commands to create object oriented program objects when the application is running.

2. The IC card reader system according to claim 1, wherein said library includes programs defining visual, audio or other objects which are resident in the memory of the IC card reader and others which are imported from the IC card or from a computer system connected to said IC card reader.

3. The IC card reader system according to claim 1, wherein said library includes programs defining visual, audio or other objects which are standardized and can be utilized in a response to a call from various application management programs.

4. The IC card reader system according to claim 1, wherein the application management program is an interpreted program language and the multitask operating system is further configured to recognize commands of an interpreted communication language.

5. The IC card reader system according to claim 1, wherein said IC card reader further comprises:
    a display device.

6. The IC card reader system according to claim 1, wherein said IC card is no larger than 25 mm$^2$.

* * * * *